United States Patent Office 2,898,336
Patented Aug. 4, 1959

2,898,336

PHENTHIAZINE DERIVATIVES

Paul Gailliot, Paris, and Francois Debarre, Eaubonne, France, assignors to Societe des Usines Chimiques Rhone-Poulenc, Paris, France, a corporation of France No Drawing. Application March 24, 1958
Serial No. 723,089

Claims priority, application France April 11, 1957

4 Claims. (Cl. 260—243)

This invention relates to new derivatives of phenthiazine and to processes for their preparation.

It is well known that various N-substituted phenthiazine derivatives possess valuable therapeutic properties. Some are useful primarily on account of outstanding anti-histaminic activity, others because of their unusually powerful effect as potentiators of drugs which act upon the nervous system and of their efficacy as anti-shock agents and yet others, for example, are effective agents for controlling or minimising motion-sickness. Nevertheless, of the very large number of possible N-substituted phenthiazine compounds that have heretofore been proposed or tested by various workers, only comparatively few types have been proven to have useful application in human or veterinary medicine. Both the nature and the degree of useful effect can radically alter even with apparently small changes in chemical structure.

It is an object of the present invention to provide new phenthiazine derivatives which possess unexpectedly useful pharmacological properties. It is a further object of the invention to provide processes for the production of these new compounds.

The phenthiazine derivatives of the present invention are those which conform to the general formula:

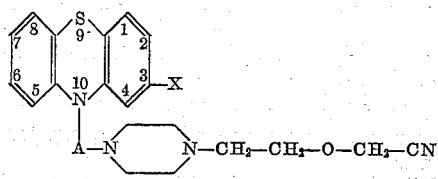

—CH$_2$—CH$_2$—O—CH$_2$—CN    I and their acid addition salts and quaternary ammonium derivatives, wherein A represents the grouping —(CH$_2$)$_3$— or the grouping

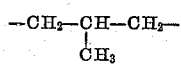

and X represents a hydrogen or halogen atom or a lower alkyl, alkoxy, acyl or alkoxycarbonyl group or a cyano, methylthio, methanesulphonyl or dimethylsulphamoyl group. The piperazine nucleus may be substituted by one or more lower alkyl groups.

The qualification "lower" as applied herein means that the group in question contains not more than four carbon atoms.

According to a feature of this invention, the aforesaid new phenthiazine compounds are prepared by the process which comprises reacting a phenthiazine derivative of the general formula:

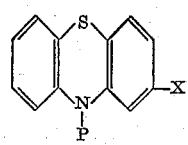

II with a piperazine derivative of the general formula:

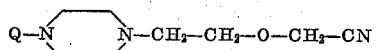

III wherein X is as hereinbefore defined and one of P and Q represents a hydrogen atom and the other represents a grouping —A—Y in which Y represents the acid residue of a reactive ester, such as a halogen atom or a sulphonic or sulphuric ester residue, and A is as hereinbefore defined.

The specific methods according to the foregoing process are:

(1) Interaction of a phenthiazine derivative of the general formula:

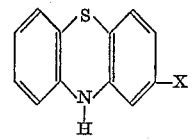

IV with a piperazine derivative of the general formula:

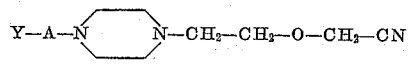

V wherein the various symbols are as hereinbefore defined. In this condensation, when X is an acyl group, it may be advantageous to protect this group during the reaction, for example, by forming an anil or ketal.

(2) Interaction of a phenthiazine derivative of the general formula:

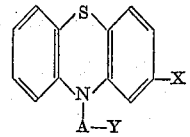

VI with a piperazine derivative of the general formula:

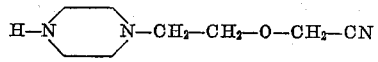

VII the various symbols being as hereinbefore defined.

The phenthiazine derivatives of general Formula I may also be prepared by the following processes:

(3) Interaction of a phenthiazine derivative of the general formula:

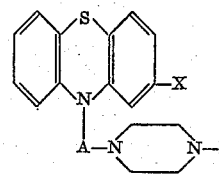

VIII with a reactive ester of the general formula:

Y—CH$_2$—CH$_2$—O—CH$_2$—CN    IX the various symbols being as hereinbefore defined.

(4) Interaction of a phenthiazine derivative of the general formula:

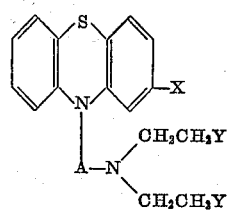

X with an amine of the general formula:

H$_2$N—CH$_2$—CH$_2$—O—CH$_2$—CN    XI the various symbols being as hereinbefore defined.

(5) Interaction of a phenthiazine derivative of the general formula:

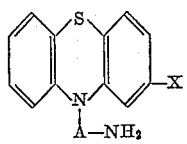

with a reactive diester of the general formula:

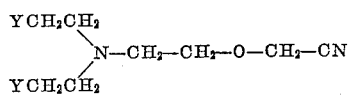

the various symbols being as hereinbefore defined.

(6) Interaction of a phenthiazine of the general formula:

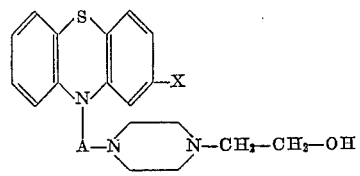

with a compound of the type Y—CH₂—CN, the various symbols being as hereinbefore defined.

The foregoing processes (1) to (6) may be carried out with or without a solvent in the presence or absence of a condensing agent. It is generally advantageous to operate in an inert organic solvent medium, such as an aromatic hydrocarbon (preferably benzene, toluene or xylene), an ether (for example, diethyl ether) or an amide (for example, dimethylformamide) usually in the presence of a condensing agent (preferably in the form of an alkali metal or a derivative thereof such a hydroxide, hydride, amide or alcoholate).

The reactions are carried out at room temperature or at an elevated temperature according to the nature of the reactants and the presence or absence of solvent and condensing agent.

(7) Decomposition of a phenthiazine-10-carboxylate of the general formula:

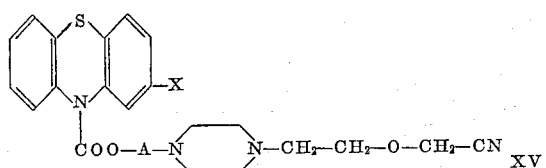

(wherein the various symbols are as hereinbefore defined) by heating the carboxylate, preferably to a temperature above 100° C., for example between 150 and 220° C., until evolution of carbon dioxide ceases.

The reaction can be effected with the phenthiazine-10-carboxylate alone, i.e. without a diluent, or in an inert medium of high boiling point such as diphenyl or diphenyl oxide, o-dichlorobenzene, quinoline or weak bases.

(8) Cyclisation, preferably in a solvent in the form of a substituted amide of a lower aliphatic acid, in the presence of an alkaline condensing agent such as an alkali metal hydroxide or carbonate and optionally in the presence of a dehydrohalogenation catalyst such as copper powder, of a compound of the general formula:

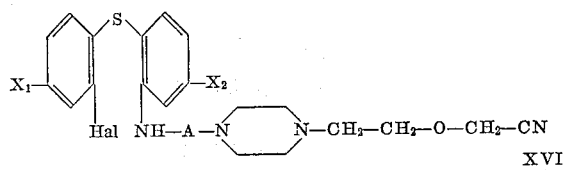

(wherein one of X₁ and X₂ represents a hydrogen atom and the other the group X, Hal represents a halogen atom, preferably chlorine or bromine, and the other symbols are as hereinbefore defined).

(9) Heating in the presence of sulphur or one of its derivatives and optionally a catalyst, such as iodine, a diphenylamine of general formula:

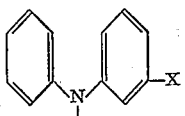

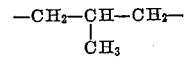

wherein the various symbols are as hereinbefore defined.

The phenthiazine derivatives of the present invention possess interesting pharmacodynamic properties. They are active as antihistaminics and are active upon the central nervous system; in particular, they are outstandingly active as cataleptics, in which respect they differ markedly from phenthiazine derivatives of closely related chemical structure e.g. compounds of the type of general Formula I in which, however, A represents an aliphatic chain other than —(CH₂)₃— or $$-CH_2-CH-CH_2-$$
$$\quad\quad\quad |$$
$$\quad\quad\quad CH_3$$

Preferred compounds are those of general Formula I in which X is a chlorine atom or a lower alkoxy (e.g. methoxy) or lower acyl (e.g. acetyl or propionyl) group; compounds particularly preferred are 10-[3-(4-cyanomethoxyethyl-1-piperazinyl)propyl] - 3 - chlorophenthiazine, 10-[3-(4-cyanomethoxyethyl-1-piperazinyl)propyl]-3-acetylphenthiazine, 10-[3-(4 - cyanomethoxyethyl-1-piperazinyl)propyl]-3-propionylphenthiazine and 10-[3-(4-cyanomethoxyethyl-1-piperazinyl)propyl] - 3 - methoxyphenthiazine.

For therapeutic purposes, the bases of general Formula I are preferably employed as such or in the form of acid addition salts containing anions which are relatively innocuous to the animal organism in therapeutic doses of the salts (such as hydrochlorides and other hydrohalides, phosphates, nitrates, sulphates, maleates, fumarates, citrates, tartrates, methanesulphonates and ethanedisulphonates) so that the beneficial physiological properties inherent in the bases are not vitiated by side-effects ascribable to the anions. Similarly, they may also be employed in the form of quaternary ammonium salts obtained by reaction with organic halides (e.g. methyl or ethyl iodide, chloride or bromide or allyl or benzyl chloride or bromide) or other reactive esters, e.g. toluene-p-sulphonates.

The following examples, in which the melting points indicated were determined on the Kofler bench, illustrate the invention.

*Example I*

A solution of 3-(3-chloro-10-phenthiazinyl)propyl toluene-p-sulphonate (6.7 g.) and 1-(2-cyanomethoxyethyl)piperazine (6.8 g.) in anhydrous toluene (95 cc.) is heated under reflux for 2½ hours. After cooling the reaction mixture is taken up in distilled water (75 cc.), stirred for 1 hour and decanted. The toluene layer is washed with distilled water (50 cc.), extracted with 0.5 N hydrochloric acid (75 cc. and 25 cc.) and the aqueous acid layer washed with ethyl acetate (50 cc.) followed by ether (50 cc.).

The base is liberated from the solution of its hydrochloride by the addition of sodium hydroxide (d=1.33; 7 cc.) and extracted with chloroform (40 cc. and 20 cc.). The chloroformic solution is washed with distilled water (50 cc.), dried over sodium sulphate, filtered and the solvent removed by distillation in vacuo. After drying at 80° C. under a pressure of 1 mm. of mercury for 2 hours, 10-[3-(4-cyanomethoxyethyl - 1 - piperazinyl)propyl]-3-chlorophenthiazine (6.2 g.) is obtained.

This base (5.94 g.) is dissolved in boiling ethanol (100 cc.) and a solution of maleic acid (3.25 g.) in ethanol (50 cc.) is added as rapidly as possible. The salt formed crystallises on cooling. The product is filtered off, washed with ethanol (5×10 cc.) and dried at 45° C. in vacuo for 24 hours. 10-[3-(4-cyanomethoxyethyl-1-piperazinyl)propyl]-3-chlorophenthiazine dimaleate (8.88 g.) is obtained, M.P. 187–188° C.

*Example II*

3 - (3 - acetyl - 10-phenthiazinyl)propyl toluene-p-sulphonate (9.95 g.) and 1-(2-cyanomethoxyethyl)piperazine (7.45 g.) in anhydrous toluene (40 cc.) is heated under reflux for 3 hours. After cooling, the reaction mixture is taken up in distilled water (100 cc.) and decanted. The toluene layer is washed again with distilled water (100 cc.) and extracted with 0.5 N hydrochloric acid (150 cc.). The aqueous hydrochloric acid layer is washed with ether (50 cc.).

The base is liberated from the solution of its hydrochloride by the addition of sodium hydroxide ($d=1.33$) and is extracted with chloroform (2×50 cc.). The chloroform solution is dried over sodium sulphate and filtered and the solvent is removed by distillation in vacuo. There is obtained 10-[3-(4-cyanomethoxyethyl-1-piperazinyl)propyl]-3-acetylphenthiazine (7.9 g.) whose dihydrochloride, crystallised from ethanol, melts at about 190° C.

*Example III*

Proceeding as in Example II but commencing with 3-(3-propionyl-10-phenthiazinyl)propyl toluene-p-sulphonate (9.8 g.) and 1-(2-cyanomethoxyethyl)-piperazine (7.2 g.), there is obtained 10-[3-(4-cyanomethoxyethyl-1-piperazinyl) - propyl] - 3-propionylphenthiazine (6.4 g.) whose dihydrochloride, crystallised from ethanol, melts at about 160° C.

*Example IV*

Proceeding as in Example II but commencing with 3-(3-methoxy-10-phenthiazinyl)propyl toluene-p-sulphonate (6 g.) and 1-(2-cyanomethoxyethyl)-piperazine (6.67 g.), there is obtained 10-[3-(4-cyanomethoxyethyl-1-piperazinyl)propyl]-3-methoxyphenthiazine (4.22 g.) whose dimaleate, crystallised from ethanol, melts at 160–162° C.

We claim:

1. A member of the class consisting of a phenthiazine derivative of the general formula:

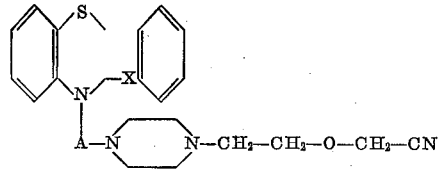

and its acid addition salts having pharmaceutically acceptable anions, wherein A represents the chain selected from —(CH$_2$)$_3$— and

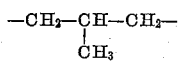

and X represents a member of the class consisting of hydrogen and halogen atoms and lower alkyl, lower alkoxy, acetyl, lower alkoxycarbonyl, cyano, methylthio, methanesulphonyl and dimethylsulphamoyl groups.

2. 10 - [3 - (4 - cyanomethoxyethyl - 1 - piperazinyl) propyl]-3-chlorophenthiazine.

3. 10 - [3 - (4 - cyanomethoxyethyl - 1-piperazinyl) propyl]-3-acetylphenthiazine.

4. 10 - [3 - (4 - cyanomethoxyethyl - 1-piperazinyl) propyl]-3-methoxyphenthiazine.

References Cited in the file of this patent

UNITED STATES PATENTS

| | | |
|---|---|---|
| 2,272,498 | Zerweck et al. | Feb. 10, 1942 |
| 2,766,235 | Cusic | Oct. 9, 1956 |
| 2,838,507 | Cusic et al. | June 10, 1958 |